US011966750B2

(12) United States Patent
Kaushik et al.

(10) Patent No.: US 11,966,750 B2
(45) Date of Patent: Apr. 23, 2024

(54) SYSTEM-ON-CHIP MANAGEMENT CONTROLLER (71) Applicant: Ampere Computing LLC, Santa Clara, CA (US)

(72) Inventors: Shivnandan Kaushik, Portland, OR (US); Harb Abdulhamid, Raleigh, NC (US); Vanshidhar Konda, Portland, OR (US); Yogesh Bansal, Beaverton, OR (US); Sachhidh Kannan, Portland, OR (US); Sebastien Hily, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/809,891

(22) Filed: Jun. 29, 2022

(65) Prior Publication Data
US 2024/0004668 A1  Jan. 4, 2024

(51) Int. Cl.
*G06F 9/4401* (2018.01)
*G06F 9/48* (2006.01)
*G06F 15/173* (2006.01)

(52) U.S. Cl.
CPC .......... *G06F 9/4403* (2013.01); *G06F 9/4812* (2013.01); *G06F 15/17381* (2013.01)

(58) Field of Classification Search
CPC . G06F 9/4403; G06F 9/4812; G06F 15/17381
See application file for complete search history.

(56) References Cited

U.S. PATENT DOCUMENTS

| | | | |
|---|---|---|---|
| 2016/0062798 A1* | 3/2016 | Lee .................. | G06F 9/4881 718/104 |
| 2019/0047579 A1* | 2/2019 | Fahim .............. | B60W 50/0225 |
| 2023/0083979 A1* | 3/2023 | Mitchell ........... | G06Q 10/0837 726/26 |

* cited by examiner

*Primary Examiner* — Terrell S Johnson
(74) *Attorney, Agent, or Firm* — Muncy, Geissler, Olds & Lowe, P.C.

(57) ABSTRACT

Disclosed are techniques for management of multiple processor cores in a multi-core system-on-chip (SoC). In an implementation, the SoC may configure each processor core in a first subset of processor cores as a management controller for performing system management functions for processor cores not in the first subset, the first subset comprising at least one processor core from the plurality of processor cores. System management functions are handled by the processor cores in the first subset, while operating system functions are handled by the processor cores not in the first subset. In an implementation, the number of processor cores to be included in the first subset (which may be zero if it is desired that the SoC may operate in legacy mode), may be controlled at boot time according to a boot setting.

20 Claims, 5 Drawing Sheets

SYSTEM-ON-CHIP MANAGEMENT CONTROLLER

BACKGROUND

I. Field of the Disclosure

Aspects of the disclosure relate generally to the management of multiple processor cores, and specifically to the management of multiple processor cores in a multi-core system-on-chip (SoC).

II. Background

Multi-core systems are a way to provide scalable processing power to customers that need a certain processing capability on which to run a customer-visible operating environment, such as a customer-visible operating system (OS) and applications, which may be referred to herein as customer processes or client processes. For example, a cloud services provider (CSP) may lease a core (or multiple cores) to a customer, and the customer presumes that the customer has exclusive use of the core or cores. However, multi-core systems conventionally devote some amount of processing cycles of those core(s) for system management functions that are separate from the customer processes running on the cores, and so some of the processing capability of the customer core may occasionally be used to execute tasks that are related to management of the multi-core system or SoC.

Conventional multi-core systems use cycle stealing, i.e., taking processing cycles from one or more of the multiple cores away from the customer processes and using those processing cycles for system management functions instead. This cycle stealing may be hidden from the OS, or the OS may be aware of the cycle stealing. However, cycle stealing can lead to jitter which is visible to the customer processes and over which the customer processes have no control, e.g., the OS and higher-level software has no control over when or how much time is spent on system management functions when they are invoked.

Accordingly, there is a need for techniques to provide the processing capability needed for system management functions of a multi-core system, including multi-core system-on-chip (SoC) implementations, with minimal or no impact on customer processes running on that multi-core system.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an example implementation, an apparatus for managing multiple processor cores in a system-on-chip (SoC) includes a plurality of processor cores; a memory; and a mesh interconnect communicatively coupled to the plurality of processor cores and the memory; wherein each processor core in a first subset of processor cores from the plurality of processor cores is configured as a management controller for performing system management functions for processor cores not in the first subset, the first subset comprising at least one processor core from the plurality of processor cores.

A portion of the memory may be reserved for use by the first subset of processor cores. The system management functions may comprise at least one of a platform-dependent service or function or a custom service or function. The SoC may include a hardware interface for triggering interrupts to the first subset of processor cores. The processors cores not in the first subset may be configured to request system management functions via the hardware interface, and the first subset of processor cores may be configured to perform system management functions in response to receiving an interrupt from the hardware interface. The first subset of processors cores may be configured to operate in a secure mode. The SoC may include a boot loader that determines which one or more of the plurality of processor cores will be in the first subset of processor cores according to a boot setting.

In an example implementation, a method of managing multiple processor cores in a system-on-chip (SoC) comprising a plurality of processor cores and a memory includes: configuring each processor core in a first subset of processor cores from the plurality of processor cores as a management controller for performing system management functions for processor cores not in the first subset, the first subset comprising at least one processor core from the plurality of processor cores; performing system management functions using at least one of the processor cores in the first subset; and performing operating system functions using at least one of the processor cores not in the first subset.

Configuring each processor core in the first subset of processor cores as a management controller may comprise configuring the first subset of processor cores to have access to a portion of the memory that reserved for use by the first subset of processor cores. Configuring each processor core in the first subset of processor cores as a management controller may comprise configuring each processor core in the first subset of processor cores to operate in a secure mode. Configuring each processor core in a first subset of processor cores from the plurality of processor cores as a management controller may comprise first determining which one or more of the plurality of processor cores will be in the first subset of processor cores. Determining which one or more of the plurality of processor cores will be in the first subset of processor cores may be performed at boot time according to a boot setting. Performing the system management functions may comprise performing at least one of a platform-dependent function or a custom function. Performing the system management functions may comprise determining that a system management function is needed or requested and performing the needed or requested system management function. Determining that a system management function is needed or requested may comprise receiving an interrupt from a hardware interface for triggering interrupts to the first subset of processor cores.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION OF THE DRAWINGS

Disclosed are techniques for management of multiple processor cores in a multi-core system-on-chip (SoC). In an implementation, the SoC may configure each processor core in a first subset of processor cores as a management controller for performing system management functions for processor cores not in the first subset, the first subset comprising at least one processor core from the plurality of processor cores. System management functions are handled by the processor cores in the first subset, while operating system functions are handled by the processor cores not in the first subset. In an implementation, the number of processor cores to be included in the first subset (which may be zero if it is desired that the SoC may operate in a conventional, non-dedicated-management-resource mode, which may also be referred to herein as a "legacy" mode), may be controlled at boot time according to a boot setting.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Figure 1:
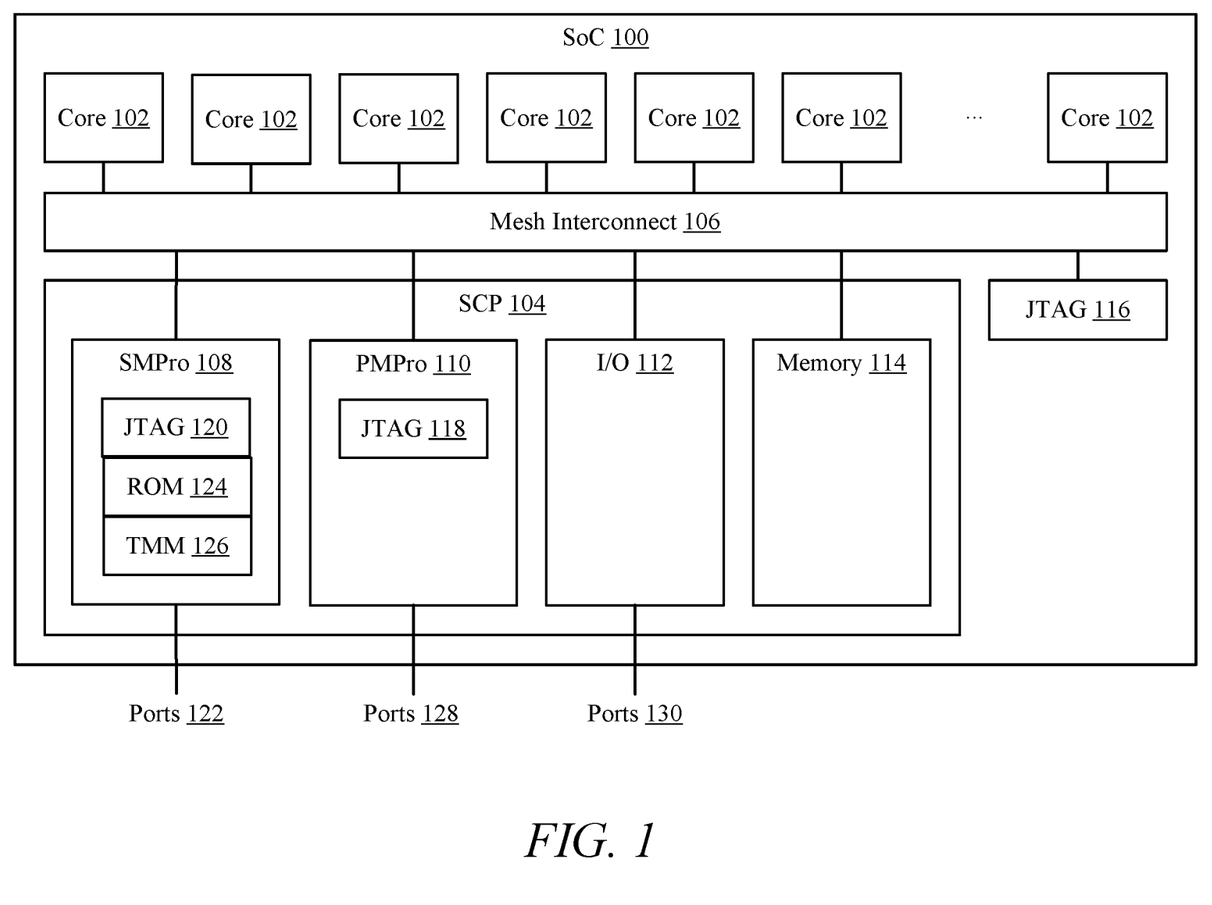
FIG. 1 is a diagram of a conventional system on a chip (SoC)

FIG. 1 is a diagram of a conventional system on a chip (SoC) 100. The conventional SoC 100 illustrated in FIG. 1 includes a set of central processing units (CPUs) 102 and a system control processor (SCP) 104 that handles many of the system management functions of the SoC 100. Each CPU 102 may also be referred to herein as a processing core 102 or simply as a core 102. The SoC 100 may include more or less than the illustrated number of CPUs (e.g., 50 CPUs, 80 CPUs, or 120+ CPUs).

The cores 102 are connected to the SCP 104 via a mesh interconnect 106 that forms a high speed bus that couples each of the CPUs 102 to each other and to other on chip and off-chip resources, including higher levels of memory (e.g., a level three (L3) cache, dual data rate (DDR) memory), peripheral component interconnect express (PCIe) interfaces, inter-integrated circuit (I2C) bus connections off-chip, and other resources. Specifically, the mesh interconnect 106 may individually couple to a security management processor or subprocessor (SMPro) 108, a power management processor or subprocessor (PMPro) 110, input/output (I/O) block 112, and memory 114 of the SCP 104. The mesh interconnect 106, an I2C interface, or other connections may couple the SCP 104 to the SoC joint test action group (JTAG) ports and firmware 116, to the PMPro JTAG ports and firmware 118, and to the SMPro JTAG ports and firmware 120.

The SMPro 108 may include a bootstrap controller and an I2C controller or other bus controller. The SMPro 108 may communicate with on-chip sensors, an off-chip baseboard management controller (BMC), and other external systems to provide control signals to external systems. The SMPro 108 may perform error handling and crash recovery for CPUs 102 of the SoC 100 and may perform power failure detection, recovery, and other fail safes for the SoC 100. The SMPro 108 manages the boot process and may include ROM and EEPROM for safely storing firmware for controlling and performing the boot process. In addition, the SMPro 108 may store and execute a BIOS (if present) for the SoC 100. Thus, the SMPro 108 is responsible for the boot up of the SoC 100 and security features may be advantageously located on the SMPro 108. The SMPro 108 may connect to one or more off-chip systems as well via ports 122 and/or may connect to off-chip systems via the I/O block 112. The SMPro 108 may include on-board ROM (or EEPROM) 124 and a trust management module (TMM) 126. The TMM 126 may be implemented as hardware or firmware or a combination thereof. The shared memory 114 may be on-board RAM or secured RAM which can be trusted by the TMM 126 after an integrity check or certificate check. In an implementation, the components of the SoC 100 may be divided into trusted components and non-trusted components, where the trusted components may be verified by certificates in the case of software components, or are pure hardware components so that at boot time the TMM 126 may ensure that the boot process is secure.

The PMPro 110 may perform the power management for the SoC 100 and may connect to one or more voltage regulators (VR) that provide power to the SoC 100. The PMPro 110 may receive voltage readings, power readings, and/or thermal readings and may generate control signals (e.g. dynamic voltage and frequency scaling (DVFS) signals) to be sent to the voltage regulators. The PMPro 110 may also report power conditions and throttling to an operating system or hypervisor running on the SoC 100. The PMPro 110 may control the provision of power for boot and may have specific power throttling and specific power connections for boot power to other portions of the system control processor (SCP) 104, which may include the SMPro 108. The PMPro 110 may receive power on control signals, voltage ramp signals, and other power control information from other components within the SCP 104, such as the SMPro 108 during boot up as hardware and firmware become activated on the SoC 100. These power-up processes and power sequencing may be automatic or may be linked to events occurring at or detected by the SMPro 108 and/or the PMPro 110. The PMPro 110 may connect to the shared memory 114, the SMPro 108, and external systems (e.g., VRs) via ports 128, and may supply power to each via power lines.

The I/O block 112 may connect over ports 130 to external systems and memory of the SoC 100, and may connect to on-board memory 114 via the mesh interconnect 106. The SCP 104 may use the I/O connections to interface with a BMC or other management systems for the SoC 100 and/or to the network of the cloud platform (e.g. via ethernet, PCIe, or fiber). The SCP 104 may perform scaling, balancing, throttling, and other control processes to manage the CPUs 102, associated memory controllers, and mesh interconnect 106 of the SoC 100. Note that although FIG. 1 illustrates the SMPro 108 and PMPro 110 as separate microcontrollers (or processors), as will be appreciated, they may be combined into one microcontroller, or sub-divided into more than two microcontrollers.

Figure 2:
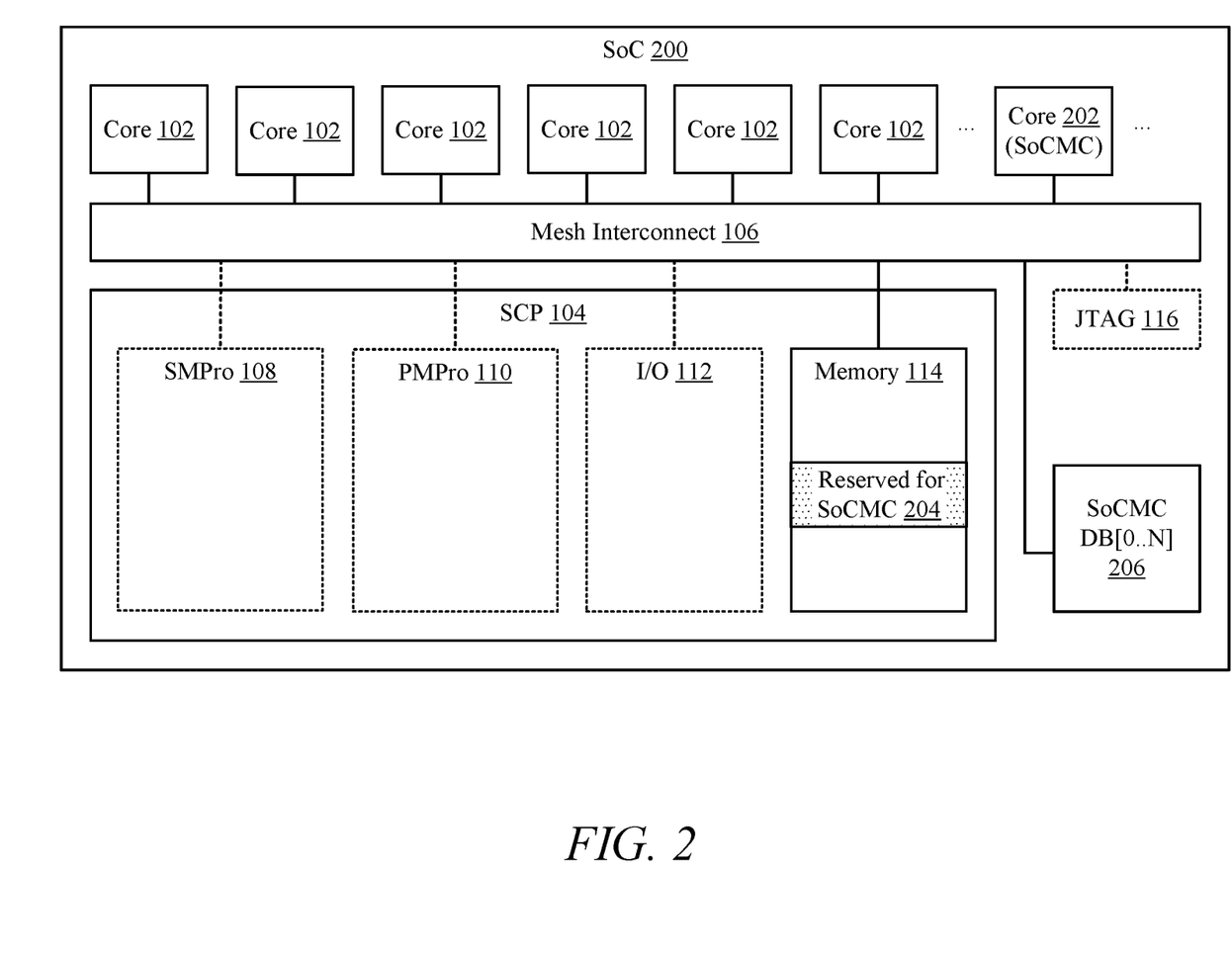
FIG. 2 is a diagram of a SoC including an SoC management controller (SoCMC) according to an implementation.

FIG. 2 is a diagram of a SoC 200 including a dedicated SoC management controller (SoCMC) according to an implementation. In the example illustrated in FIG. 2, one of the cores 102 of the SoC 200 operates as an SoCMC core 202, which is a core that is responsible for running all platform-dependent, custom, and maintenance software in a secure environment. In an implementation, the non-SoCMC cores 102 are available for a cloud service provider (CSP) operating system (OS) or hypervisor, or for whatever OS and/or application that the customer or client wants to run, including bare-metal instances (e.g., where the client software runs directly on the core rather than within a CSP controlled environment). An OS provided by a cloud service provider (CSP), may be referred to herein as a "CSP OS" (or more generically a "host OS"), which itself may host a client OS, client applications, or both.

The SoC 200 also includes a mesh interconnect 106 and an SCP 104 that includes a memory 114, which are substantially identical to their like-numbered equivalents in FIG. 1, and therefore the descriptions of which will not be repeated here. The SoC 200 may optionally include an SMPro 108, a PMPro 110, an I/O block 112, an SoC JTAG block 116, and other sub-blocks shown in FIG. 1 but not shown in FIG. 2. It will be understood that the division of labor among the various blocks is illustrative and not limiting: the functionality provided by SMPro 108, PMPro 110, etc., may be partitioned and/or grouped in other ways without departing from the scope of the disclosure. In an implementation, the SoCMC core 202 is not directly accessible by a non-SoCMC core 102.

In an implementation, one or more of the cores 102 may be configured or designated to perform the SoCMC tasks, i.e., configured as an SoCMC core 202, and otherwise will operate as a non-SoCMC (e.g., legacy or conventional) core 102. In an implementation, only a specific core or subset of cores can be configured to operate as SoCMC core(s) 202. In another implementation, any one of the cores 102 may be configured to operate as the SoCMC core 202. For example, in an implementation, the core chosen to be configured to operate as the SoCMC core 202 may be randomly selected, or selected based on a selection algorithm. For example, if a particular subset of cores 102 may be configured as an SoCMC core 202, the core chosen to be the SoCMC core 202 may be selected from that subset. In another example, an SoCMC core 202 may be selected from any of the cores 102 that meet some requirement, such as processing speed, throughput, clock frequency, etc. In another aspect, each of the cores 102 may be speed-binned during fabrication, in which case only some of the slower cores 102 may be used as SoCMC cores 202. These selection examples are illustrative and not limiting.

In an implementation, the SoCMC core(s) 202 may be dedicated core(s) separate from the non-SoCMC cores 102. In an implementation, if the SoC 200 does not need to perform SoCMC tasks, e.g., if it is desired that the SoC 200 operate in legacy mode, any dedicated SoCMC core 202 is simply unused (or, alternatively, made available for use as a legacy core 102).

In an implementation, the one or more cores 102 may be configured as SoCMC core(s) 202 during boot mode; for example, there may be a boot mode option to configure one or more of the cores 102 to be SoCMC core(s) 202 or to configure none of the cores 102 to be an SoCMC core 202 (e.g., to operate as a conventional SoC that does not have SoCMC core functionality).

In an implementation, if a currently configured SoCMC core 202 fails or exhibits sufficient degradation of performance (or other metric), another core 102 may be dynamically configured as the SoCMC core 202 as a failover response. In an implementation, if an SoCMC core 202 exceeds a loading threshold, a non-SoCMC core 102 may be dynamically configured to also be an additional SoCMC core 202. In an implementation, the previously existing SoCMC core(s) 202 and the additional SoCMC core(s) 202 can engage in load sharing of the service requests from the non-SoCMC cores 102.

In an implementation, the SoCMC core 202 runs in secure mode. In some aspects, a secure mode comprises a mode having elevated access to other SoC subsystems, memory, regions, or services. For example, the SoCMC core 202 may have access to a dedicated portion 204 of memory 114 that is reserved for use by the SoCMC core(s) 202. In an implementation, isolation and security are provided via the use of secure partitions running on the SoCMC core, via running only trusted (e.g., authenticated and verified) code on the SoCMC core.

In an implementation, the SoCMC core 202 can provide a suite of services that operate asynchronously with respect to the non-SoCMC cores 102, and that the non-SoCMC cores 102 can request to perform a management function via an interface. In an implementation, an OS or application running on a non-SoCMC core 102 can request a service via a device driver for interfacing with the underlying hardware. One example of such hardware is what is called a doorbell (SoCMC DB) 206. In an implementation, the driver will submit a request through the SoCMC DB 206, which will in turn generate an interrupt to the SoCMC core 202. In response to the request, the SoCMC core 202 can execute the requested task in the background and notify the requesting core when the requested task is complete. For example, the SoCMC core 202 may submit a request through the SoCMC DB 206, which will generate an interrupt to the requesting non-SoCMC core 102.

Example services that can run on an SoCMC core 202 include, but are not limited to, platform dependent services, custom services, maintenance services, secure services, and any other service or capability envisioned by a cloud service provider (CSP).

Platform dependent services may include services such as peripheral component interconnect express (PCIe) hot plug (HP), and firmware (FW) update requests. For example, when a PCIe card is hot plugged into a system, some amount of setup may be required to support the newly-inserted PCIe card, such as enabling the card, loading the card's device drivers, etc. Another example is to handle updating firmware of the SMPro 108, PMPro 110, or other component of the SoC 200.

Custom services may include services such as reliability, availability, and serviceability (RAS) handlers, correctable error (CE) formatting, additional information, handling memory CEs, CE thresholding (monitoring and managing CE storms), support for different memory topologies, and final control over what gets logged by the BMC handler or other platform-level services, which interfaces with rack-level management software.

Secure services may include services such as SoCMC core 202 programs that run at privileged processor exception levels and have access to a privileged region of system memory (such as the firmware updates described above, which in some aspects may need to be performed in secure mode).

CSP services may include services such as enabling CSP monitoring of bare metal instances, i.e., where a client runs its own OS (e.g., a client OS) directly on a rented core, rather than as a virtual machine running on top of a CSP OS. Executing a portion of a client OS or client application may be referred to herein as executing a "client task." When the client runs its own OS on the rented core, the CSP provider may not have any access to the internal workings of the client OS instance and client applications running on the client OS. However, where the client OS has a device driver that can make SoCMC service calls, monitoring SoCMC service calls made by the client OS can provide the CSP provider at least some level of monitoring of activity on the bare metal instance, usually without degrading the bare metal customer experience.

Figure 3A:
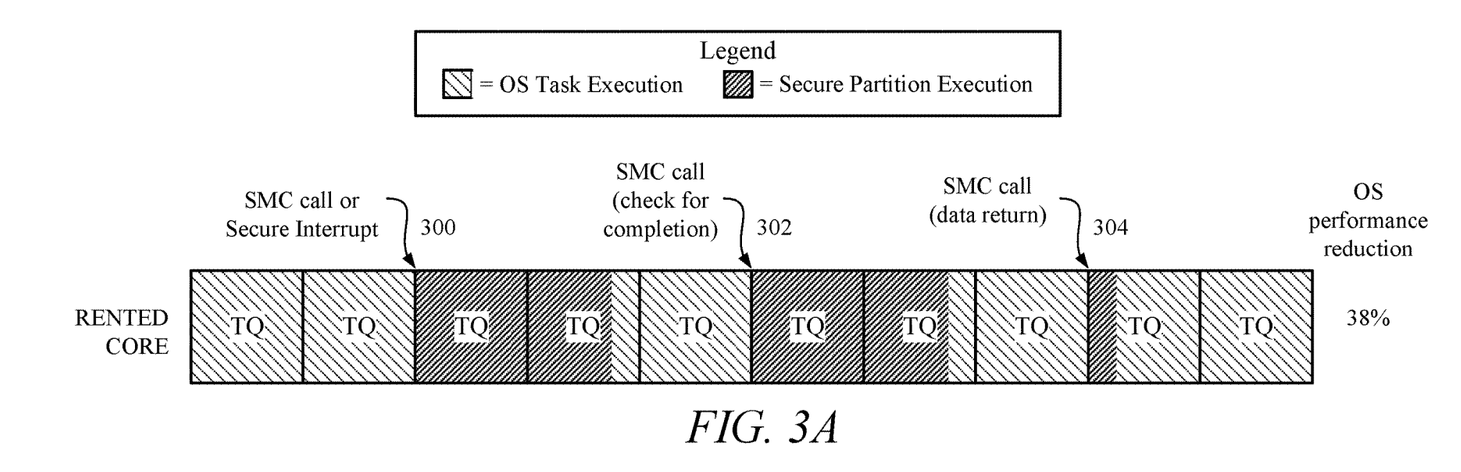
FIG. 3A is a timing diagram illustrating secure partition execution in a conventional SoC.
Figure 3B:
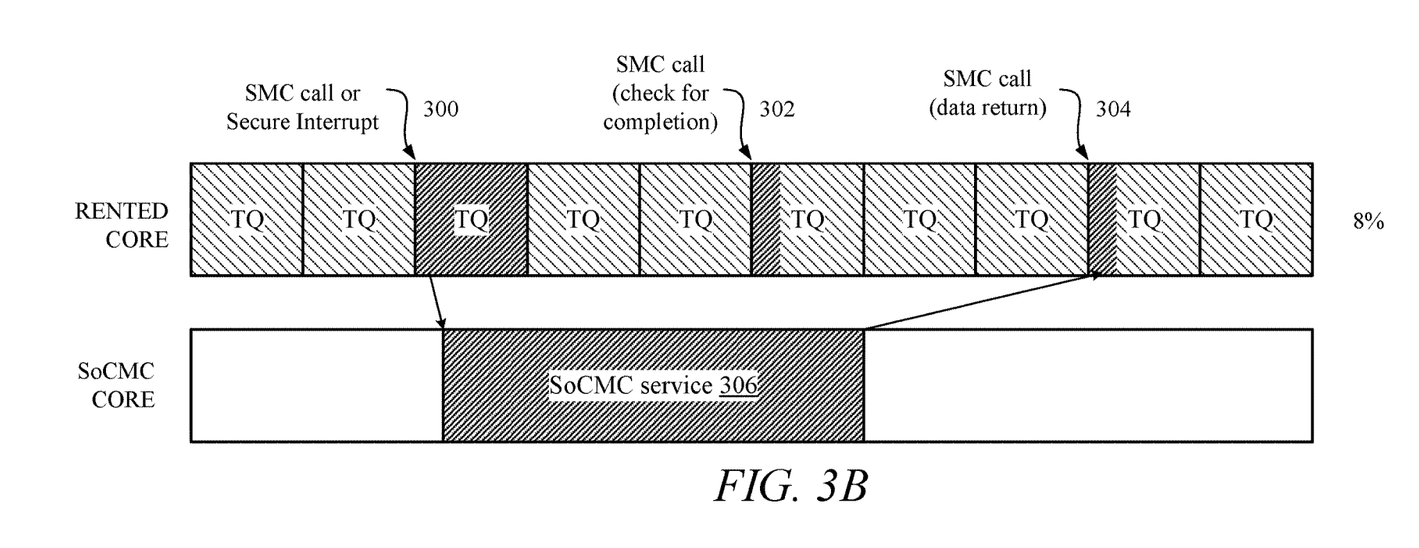
FIG. 3B is a timing diagram illustrating secure partition execution in an SoC including an SoCMC according to an implementation.

FIG. 3A and FIG. 3B are timelines illustrating secure partition execution in a conventional SoC (FIG. 3A) versus using an SoCMC core 202 according to an implementation (FIG. 3B). Both FIG. 3A and FIG. 3B show a series of task quanta (TQ), which are either used for OS task execution (e.g., customer tasks)—or for secure partition execution (e.g., system tasks), as illustrated by the legend. For simplicity of illustration, FIG. 3A shows the timeline for one of the cores and FIG. 3B shows the timeline for one of the (non-SoCMC) cores 102 and one of the SoCMC cores 202, but it is noted that the core timelines shown in FIG. 3A and FIG. 3B may represent more than one of the cores collectively. In both the example illustrated in FIG. 3A and the example illustrated in FIG. 3B, the rented core is executing OS tasks when there is a system management call (SMC) or secure interrupt 300, followed by an SMC to check for completion 302, followed by an SMC to return the data 304. An SMC is a request for a service provided by the OS, where the request is made by a higher level of software, such as an application. A secure interrupt is a type of interrupt, usually triggered by an external event.

In FIG. 3A, upon receiving the SMC or secure interrupt 300, the rented core preempts an OS task in order to perform a Secure Partition (SP) task, e.g., by handling an interrupt, or by some other preemption mechanism. Upon completion of the SP task, the rented core resumes performing OS tasks. Upon receiving the SMC to check for completion 302, the rented core again preempts the OS task to perform an SP task, e.g., to respond to the check for completion, and again resumes performing OS tasks. Upon receiving the SMC to return the data 304, the rented core again preempts the OS task to perform an SP task, e.g., to respond with the requested data, and yet again resumes performing OS tasks. In the example shown in FIG. 3A, the SP tasks take up a significant portion of the available TQ—approximately 38%—that would otherwise be used to perform OS tasks. Since SP tasks may not be observable by a CSP client's OS or applications running on the rented core, from the client's perspective the performance of the OS or applications running on their rented core may inexplicably and/or unpredictably decrease, sometimes dramatically.

In FIG. 3B, in response to each of the SMC call or secure interrupt 300, the SMC call to check for completion 302, and the SMC call to return the data 304, the rented core preempts the currently running OS task for only the time required to forward the request to (or otherwise transfer responsibility to) the SoCMC core 202, which handles the request as part of an SoCMC service 306. In the example shown in FIG. 3B, the SP tasks take up a much smaller portion of the rented core's TQ—approximately 8%—that would otherwise be used to perform OS tasks. Because the rented core is freed from having to relinquish a large portion of its TQ to SP tasks, and instead hands the SP tasks off to the SoCMC core 202, the client does not see as large a performance drop as would be seen in a conventional SoC that does not have an SoCMC core 202. In the case where there is an SoCMC core, in some aspects, only the standard interrupt handler procedure would be executed regardless of which core is going to perform SP tasks run on the non-SoCMC core. This approach can make the performance change due to an SMC call more predictable, since the performance cost for an SMC call will be effectively fixed (e.g., the time to execute a standard interrupt handler) rather than variable (e.g., the interrupt handler time plus whatever time the SP task takes). The performance impact for the legacy core 102 is a bounded by the time it takes to submit the request and the time it takes to process the response. The non-determinant processing time of the management event is handled by the SoCMC core 202. This constrains the perturbation for the task on non-CMC core 102.

It is noted that the relative numbers in the examples shown in FIG. 3A and FIG. 3B, i.e., 38% and 8%, are for illustration only and are not limiting. Whatever the performance impact to a core on a conventional SoC is, the performance impact to a non-SoCMC core 102 on an SoC with an SoCMC core 202 should be less. As shown in FIG. 3A and FIG. 3B, the amount of cycle stealing from the rented core is reduced for an SoC 200 with an SoCMC core 202 compared to an SoC 100 without an SoCMC core 202.

For example, hot-plugging a PCIe card into a server causes a secure interrupt to the CSP OS, which gets trapped into a secure partition of the memory 114. The client OS—typically running in a virtual machine (VM) hosted by the CSP OS—does not see this interrupt. However, the secure interrupt needs to be processed by one or the CPUs on the SoC, and in a conventional SoC, the secure interrupt is processed by one of the rented cores (as shown in FIG. 3A). The client processes running on the rented core have no knowledge that the secure interrupt occurred, and thus cannot mitigate or even predict the preemption. In contrast, in a SoC with an SoCMC core 202, the secure interrupt is processed by the SoCMC core 202 (as shown in FIG. 3B), and the impact on the client processes running on the rented core is reduced.

In another example, a client process may request some action of the CSP OS, and in order to respond to that request, the CSP OS may generate some SMC or secure interrupt. A conventional SoC must take processing cycles from one of the rented cores to handle that request, but an SoC with an SoCMC core 202 can use the SoCMC core 202, rather than one of the rented cores, to handle that request. Thus, in this example also the impact on the client processes is reduced.

In yet another example, the CSP OS may need to perform some action to benefit the client processes, whether or not there was a request from a client process, and that action involves an SMC or secure interrupt. Here also, the impact on the client processes is reduced by the use of the SoCMC core 202 rather than cycle stealing from a rented core.

Figure 4:
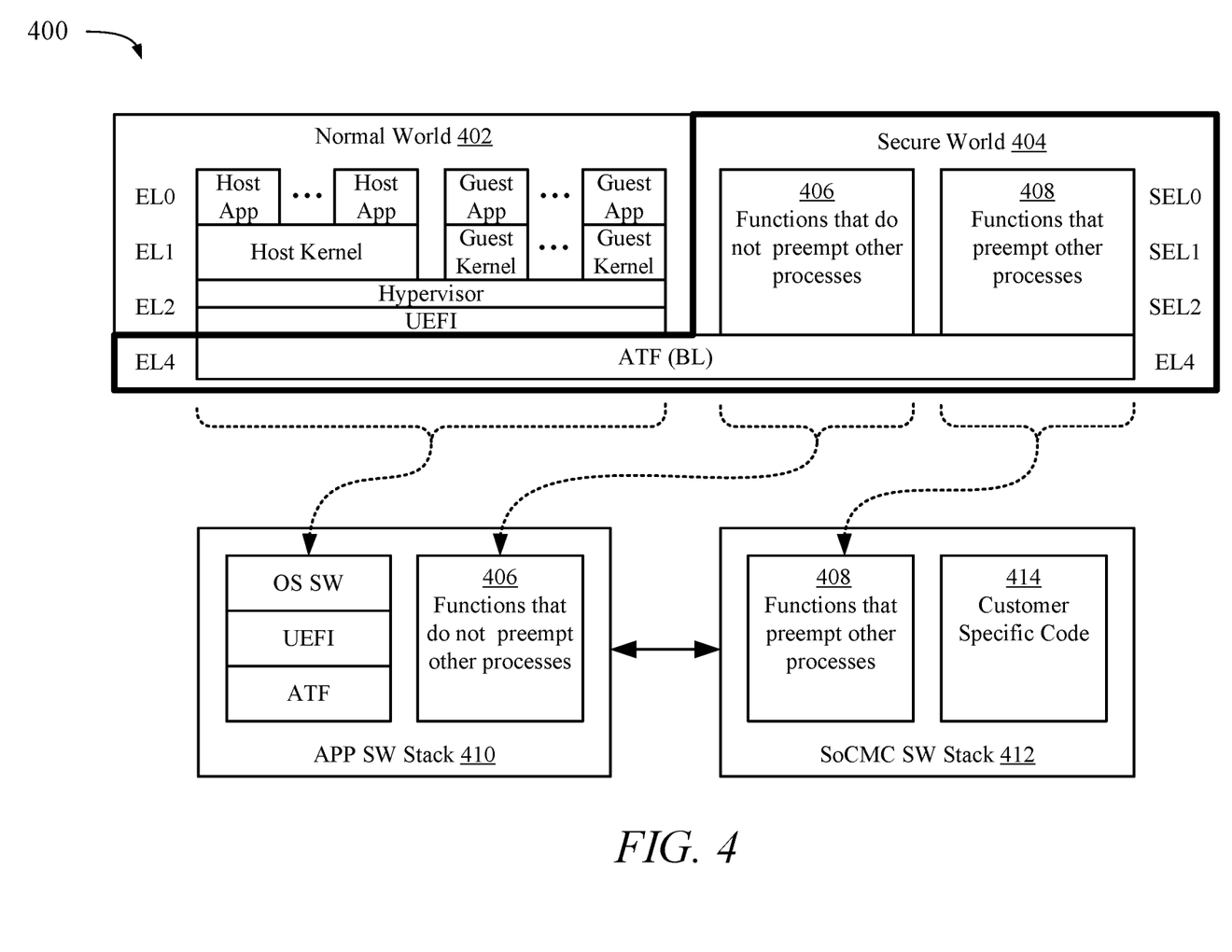
FIG. 4 is a diagram showing partitioning of processing tasks in a SoC according to an implementation.

FIG. 4 is a diagram showing partitioning of processing tasks in a SoC according to an implementation. FIG. 4 illustrates a software (SW) architecture 400 having a normal (i.e., non-secure) world 402 and a secure world 404.

In an implementation, tasks within the normal world 402 have different levels of privilege. The ARM architecture, for example, defines four exception levels: EL0, EL1, EL2, and EL3, with EL0 having the least amount of privilege and EL3 having the most amount of privilege. In the example shown in FIG. 4, applications operate at EL0, kernels operate at EL1, a hypervisor with a universal extensible firmware interface (UEFI) operates at EL2, and ARM trusted firmware (ATF) with a boot loader (BL) layer operates at EL3.

In an implementation, tasks within the secure world 404 also operate at different levels of privilege. ARM architecture, for example, defines four secure exception levels: SEL0 (lowest), SEL1, SEL3, and EL3 (highest). For simplicity of explanation, secure functions, regardless of the (S)EL level, can be grouped into functions that do not preempt other processes 406 and functions that preempt other processes 408.

In an implementation, the SW architecture 400 includes an application software (APP SW) stack 410, representing operations performed on a non-SoCMC core 102, and an SoCMC software (SoCMC SW) stack 412, representing operations performed on an SoCMC core 202. As illustrated in FIG. 4, the normal world tasks and the functions that do not preempt other processes 406 may be executed on the APP SW stack 410, while the functions that preempt other processes 408 may be executed on the SoCMC SW stack 412, along with customer-specific code 414. Thus, in an implementation, at least some of the secure world 404 functionality moves to the SoCMC core 202. In an implementation, normal world 402 functionality may interact with the SoCMC SW stack 412 using a reduced or thinned boot loader (BL) layer in the ATF. In an implementation, the SoCMC SW stack 412 handles requests from the APP SW stack 410. In an implementation, the SoCMC SW stack 412 handles platform events.

Figure 5:
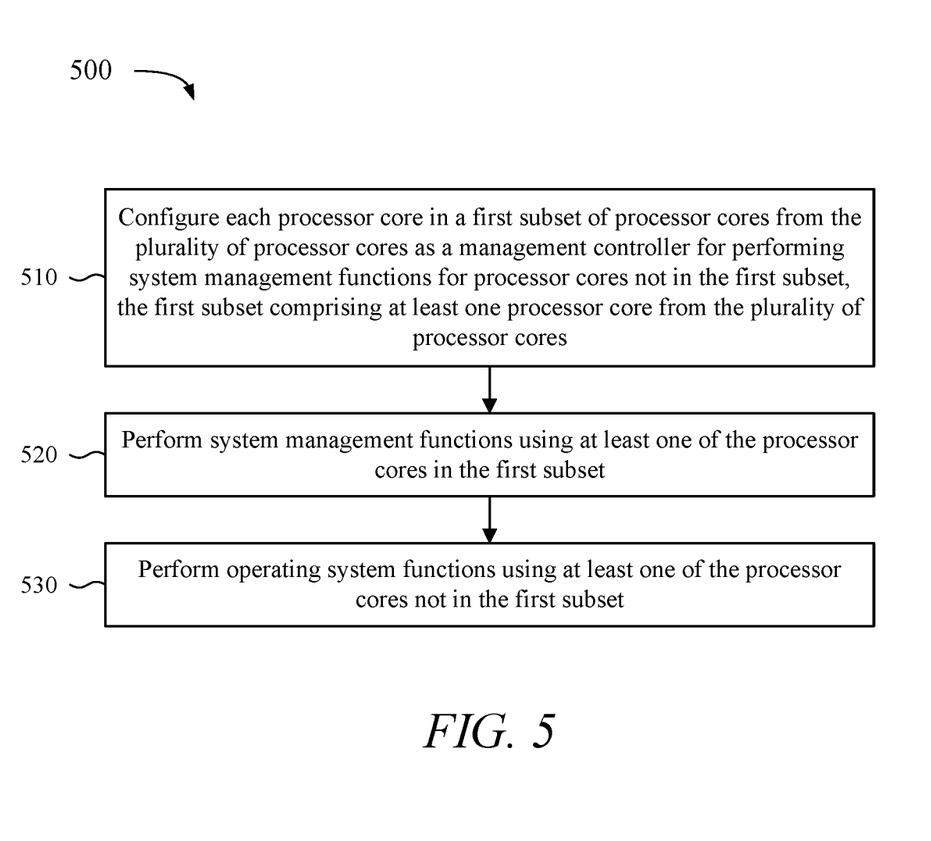
FIG. 5 is a flowchart of an example process 500 associated with managing multiple processor cores in a system-on-chip (SoC) according to an implementation.

FIG. 5 is a flowchart of an example process 500 associated with managing multiple processor cores in a system-on-chip (SoC), according to an implementation. In some implementations, one or more process blocks of FIG. 5 may be performed by a SoC (e.g., SoC 200). In some implementations, one or more process blocks of FIG. 5 may be performed by another device or a group of devices separate from or including the SoC 200.

As shown in FIG. 5, process 500 may include, at block 510, configuring each processor core in a first subset of processor cores from the plurality of processor cores as a management controller for performing system management functions for processor cores not in the first subset, the first subset comprising at least one processor core from the plurality of processor cores. The processor cores that make up the first subset may be statically or dynamically defined. For example, in some aspects, only a specific subset of the plurality of processor cores may be available for use to be configured as management controllers as needed. In other aspects, any of the plurality of processor cores may be configured as management controllers as needed.

In some aspects, configuring the one processing core as a management controller comprises configuring the first subset of processor cores to have access to a portion of the memory that reserved for use by the first subset of processor cores.

In some aspects, configuring each processor core in the first subset of processor cores as a management controller comprises configuring each processor core in the first subset of processor cores to operate in a secure mode.

In some aspects, configuring each processor core in a first subset of processor cores from the plurality of processor cores as a management controller comprises first determining which one or more of the plurality of processor cores will be in the first subset of processor cores.

In some aspects, determining which one or more of the plurality of processor cores will be in the first subset of processor cores is performed at boot time according to a boot setting.

As further shown in FIG. 5, process 500 may include, at block 520, performing system management functions using at least one of the processor cores in the first subset.

In some aspects, performing the system management functions comprises performing at least one of a platform-dependent function, a custom function, or a maintenance function.

In some aspects, performing the system management functions comprises determining that a system management function is needed or requested, and performing the needed or requested system management function.

In some aspects, determining that a system management function is needed or requested comprises receiving an interrupt from a hardware interface for triggering interrupts to the first subset of processor cores.

As further shown in FIG. 5, process 500 may include, at block 530, performing operating system functions using at least one of the processor cores not in the first subset.

In some aspects, performing operating system functions comprises requesting system management functions from at least one of the processor cores in the first subset.

In some aspects, requesting system management functions comprises requesting system management functions via a hardware interface for triggering interrupts to the first subset of processor cores.

Process 500 may include additional implementations, such as any single implementation or any combination of implementations described below and/or in connection with one or more other processes described elsewhere herein. Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The provision of an SoCMC core 202 provides a number of technical advantages, including but not limited to enhancing management capability of a socket or node (e.g., a complete independent system or blade, which may be single or multi-socketed) in the system and enabling a CSP provider to offer a customized capability to manage a node with minimal performance perturbation to the other (e.g., rented) cores.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus for managing multiple processor cores in a system-on-chip (SoC), the apparatus comprising:
    a plurality of processor cores;
    a memory; and
    a mesh interconnect communicatively coupled to the plurality of processor cores and the memory;
    wherein each processor core in a first subset of processor cores from the plurality of processor cores is configured as a management controller for performing system management functions for processor cores not in the first subset, the first subset comprising at least one processor core from the plurality of processor cores.

2. The apparatus of claim 1, wherein the processor cores not in the first subset are configured to perform operating system functions.

3. The apparatus of claim 1, wherein a portion of the memory is reserved for use by the first subset of processor cores.

4. The apparatus of claim 1, wherein the system management functions comprise at least one of a platform-dependent service or a custom service.

5. The apparatus of claim 1, further comprising a hardware interface for triggering interrupts to the first subset of processor cores.

6. The apparatus of claim 5, wherein the processors cores not in the first subset are configured to request system management functions via the hardware interface.

7. The apparatus of claim 5, wherein the first subset of processor cores are configured to perform the system management functions in response to receiving an interrupt from the hardware interface.

8. The apparatus of claim 1, wherein the first subset of processor cores are configured to operate in a secure mode.

9. The apparatus of claim 8, wherein operating in the secure mode comprises operating in a mode having elevated access to other SoC subsystems, memory, regions, or services.

10. The apparatus of claim 1, further comprising a boot loader for determining which one or more of the plurality of processor cores will be in the first subset of processor cores according to a boot setting.

11. A method of managing multiple processor cores in a system-on-chip (SoC) comprising a plurality of processor cores and a memory, the method comprising:
    configuring each processor core in a first subset of processor cores from the plurality of processor cores as a management controller for performing system management functions for processor cores not in the first subset, the first subset comprising at least one processor core from the plurality of processor cores;
    performing the system management functions using at least one of the processor cores in the first subset; and
    performing operating system functions using at least one of the processor cores not in the first subset.

12. The method of claim 11, wherein configuring each processor core in the first subset of processor cores as a management controller comprises configuring the first subset of processor cores to have access to a portion of the memory that reserved for use by the first subset of processor cores.

13. The method of claim 11, wherein configuring each processor core in the first subset of processor cores as a management controller comprises configuring each processor core in the first subset of processor cores to operate in a secure mode.

14. The method of claim 11, wherein configuring each processor core in the first subset of processor cores from the plurality of processor cores as a management controller comprises first determining which one or more of the plurality of processor cores will be in the first subset of processor cores.

15. The method of claim 14, wherein determining which one or more of the plurality of processor cores will be in the first subset of processor cores is performed at boot time according to a boot setting.

16. The method of claim 11, wherein performing the system management functions comprises performing at least one of a platform-dependent service or a custom service.

17. The method of claim 11, wherein performing the system management functions comprises:
    determining that a first system management function is needed or requested; and
    performing the first system management function.

18. The method of claim 17, wherein determining that the first system management function is needed or requested comprises receiving an interrupt from a hardware interface for triggering interrupts to the first subset of processor cores.

19. The method of claim 11, wherein performing operating system functions comprises requesting system management functions from at least one of the processor cores in the first subset.

20. The method of claim 19, wherein requesting system management functions comprises requesting system management functions via a hardware interface for triggering interrupts to the first subset of processor cores.

* * * * *